G. F. GREENWOOD.
VEHICLE COUPLING.
APPLICATION FILED AUG. 28, 1918.
1,363,777.
Patented Dec. 28, 1920.
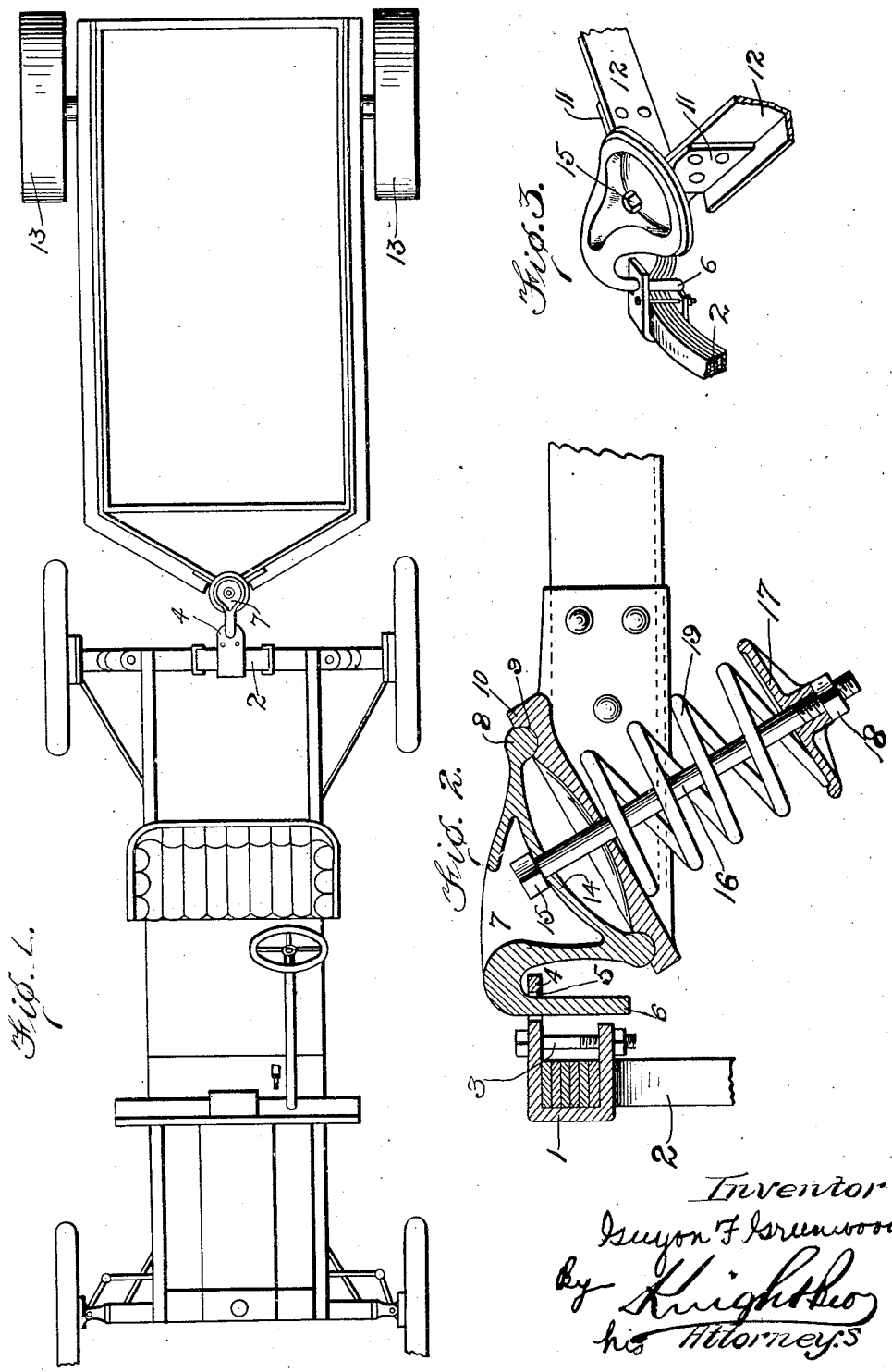

UNITED STATES PATENT OFFICE.

GUYON F. GREENWOOD, OF GEORGEVILLE, QUEBEC, CANADA.

VEHICLE-COUPLING.

1,363,777.  Specification of Letters Patent.  Patented Dec. 28, 1920.

Application filed August 28, 1918. Serial No. 251,856.

*To all whom it may concern:*

Be it known that I, GUYON F. GREENWOOD, a citizen of the Dominion of Canada, residing at Georgeville, Province of Quebec, Dominion of Canada, have invented certain new and useful Improvements in Vehicle-Couplings, of which the following is a specification.

This invention relates to couplings for vehicles or the like and has for one of its objects to provide an improved device of this character for service on roads that are rough and on roads that are soft and non-resistant. Over roads that are rough and resistant, my improved coupling is of peculiar service in that it reduces wear and tear on vehicle or trailer. On roads that are soft and non-resistant, it reduces the wear and tear on the road itself and hence saves power in the operation of a tractor and reduces the strain on engine and power connections. Another object of the present invention is to provide a universal coupling of improved construction for connecting a tractor and trailer in such a way that while the trailer is caused to trail accurately in the path of the tractor, yet said trailer remains substantially independent of the tractor in so far as differences in angular position are concerned. Other objects of invention will appear in the specification and be pointed out in the appended claims, reference being had to the accompanying drawings which show a preferred embodiment and in which,—

Figure 1 is a top plan view of a tractor and trailer which are coupled by means of a coupling according to the present invention;

Fig. 2 is a vertical section on an enlarged scale of the coupling, parts being broken away and parts shown in elevation;

Fig. 3 is a perspective view of the coupling and adjacent parts, parts being broken away and parts shown in section.

Referring more particularly to the drawings, according to the embodiment of my invention shown therein, a shackle 1 is mounted on the rear spring 2 of an automobile tractor, said shackle being retained in position by a bolt 3. The upper flange of the shackle is extended rearwardly to provide a lobe 4 having a hole 5 therein for the reception of a pivot pin 6 preferably in the form of a downwardly deflected horn, which is integral with a coupling member 7. The coupling member 7 is provided with an annular bearing ring 8 which is part-circular in cross section to adapt it to fit into a circular groove 9 which constitutes an annular bearing surface in another coupling member 10. As shown best in Fig. 3, the coupling member 10 is provided with diverging plates 11 secured to the angle bars 12 which thus constitute portions of the framework of a trailer having the carrying wheels 13. The upper convex wall 14 of the coupling member 7 is provided with an opening centrally disposed with reference to the bearing ring 8, said wall being adapted to have an oscillating connection with the head 15 of the coupling bolt 16 which also passes through the lower coupling member 10 and projects downwardly and rearwardly. On the lower end of the coupling bolt 16 is mounted a flange or abutment 17 which is adjustably secured in position by means of a nut 18. Interposed between the flange or abutment 17 and the lower flat wall of the coupling member 10, is a compression spring 19 which yieldably presses the coupling members together. By an inspection of Fig. 2, it will be seen that the annular bearing surfaces of the coupling members 7 and 10 are inclined forwardly and downwardly with reference to the plane of the trailer frame. By means of this construction, the trailer frame is pivotally connected to the vehicle on the rear spring of the tractor, while at the same time the coupling provides a universal movement of limited extent which permits an independent angular arrangement of the trailer with respect to the tractor. Thus the coupling members 7 and 10 are free to slide circularly in a plane which is inclined to the plane of the tractor, the bearing surfaces of the coupling members being suitably formed to permit a pivotal movement transversely to this plane about any point around this bearing surface. By means of the swiveling connection between the bolt 16 and the coupling members 7 and 10, the pivotal movements due to shocks and jars are taken up by means of the compression spring 19, the tension of which may be adjusted to suit conditions by means of the nut 18. By an inspection of Fig. 2, it will be seen that when the vehicle is in motion, the coupling member 7 is subjected to a load stress acting downwardly and rearwardly along the axis of bolt 16; an upward trailer supporting reaction exerted vertically by the rear edge 4 of shackle 1; and a horizontal forward pull on the coupling pin 6. It will be understood that by arranging the contacting surfaces between members 8 and 10 substantially in a plane which is inclined to the trailer frame, the draft stress tends to revolve coupling member 7 around the lowermost point in bearing ring 8 while the load reaction at the rear edge 4 of the shackle 1, tends to revolve said coupling member around the uppermost point of bearing ring 8. The size and stiffness of the spring 19 may vary to correspond to the loads to be transported as well as to the character of the roads to be traversed. In general, heavy loads as well as heavy or rough roads will require a stiffer and larger spring than light loads and smooth hard roads. Within certain limits, the normal tension of any given spring 19, may be modified by moving the abutment plate 17 along the rod 16 and securing it in any desired position by means of nut 18. This construction has been found to be of peculiar merit in such locations as sandy wastes or deserts, as well as in places where the roadway is rough and highly resistant. In the former instance, the coupling, by permitting a desirable adjustment between tractor and trailer, materially reduces the tearing action on the roadway surface which in turn produces undesirable wear and tear on the vehicles, while in the latter instance, the wear and tear is materially reduced for the same reasons, by means of the universal coupling under yielding pressure.

I claim:—

1. The combination with a vehicle, of a trailer therefor, and a coupling for connecting said vehicle and trailer, said coupling comprising members normally bearing on each other in a plane inclined to the horizontal, said members being movable relatively to each other and transversely with respect to said plane, and yieldable means tending to retain them in normal bearing contact substantially within said plane, said yieldable means permitting relative oscillation between said members and transverse to said plane.

2. The combination with a vehicle frame, of a coupling member pivotally mounted on said vehicle frame, another coupling member having slidable bearing contact with the first mentioned coupling member in a plane inclined to said vehicle frame, a trailer mounted on wheels at one end and suspended at its other end from the second mentioned coupling member, and means normally holding said members with their bearing surfaces in said plane.

3. The combination with a vehicle frame, of a trailer frame, coupling members connected to said frames respectively, said members having a ring and groove bearing inclined to the horizontal and permitting articulating movements transversely to the plane of inclination of said bearing, and means tending to hold said members in close bearing contact.

4. The combination with a vehicle frame, of a trailer frame, coupling members connected to said frames respectively and having bearing contact about a common axis, and means yieldably holding said coupling members against relative axial displacement, said axis being inclined with respect to said frames.

5. The combination with a vehicle frame, of a trailer frame, coupling members connected to said frames respectively and having bearing contact about a common axis, and means yieldably holding said coupling members against relative axial displacement, said axis being inclined with respect to said frames, one of said members being rigidly connected to one of said frames.

6. The combination with a vehicle frame, of a trailer frame, a coupling member secured to said trailer frame, a coupling member connected to said vehicle frame, said coupling members having annular bearing surfaces of circular cross section to adapt them for relative pivotal movement on each other, a bolt centrally disposed with respect to said bearing surfaces and having swiveling engagement with said coupling members, and means carried by said bolt for yieldably pressing said coupling members together, said coupling members having their bearing surfaces inclined to the planes of said frames.

GUYON F. GREENWOOD.